United States Patent [19]
Littlefield, Jr.

[11] Patent Number: 5,732,828
[45] Date of Patent: Mar. 31, 1998

[54] SHALE SHAKER APPARATUS

[76] Inventor: Don Littlefield, Jr., P.O. Box 52808, D.C.S., Lafayette, La. 70505

[21] Appl. No.: 648,453

[22] Filed: May 15, 1996

Related U.S. Application Data

[63] Continuation of Ser. No. 205,226, Mar. 3, 1994, abandoned.
[51] Int. Cl.⁶ .................................................. B07B 1/42
[52] U.S. Cl. ...................... 209/365.1; 209/366; 198/766; 74/42
[58] Field of Search ............................. 209/325, 326, 209/364, 365.1, 365.2, 366, 366.5, 367; 198/763, 766; 74/37, 42, 61; 384/407, 412

[56] References Cited

U.S. PATENT DOCUMENTS

| | | | |
|---|---|---|---|
| Re. 21,318 | 1/1940 | Sloane. | |
| 2,029,133 | 1/1936 | Sloane | 74/26 |
| 2,142,382 | 1/1939 | Sloane | 198/766 X |
| 2,215,338 | 9/1940 | Sloane | 198/766 |
| 2,225,444 | 12/1940 | Gary | 209/366 X |
| 2,947,410 | 8/1960 | Carrier, Jr. | 198/763 |
| 3,240,322 | 3/1966 | Allen et al. | 198/766 |
| 3,378,142 | 4/1968 | Wehner | 209/365.2 X |
| 3,583,246 | 6/1971 | Stahle et al. | 209/367 X |
| 3,666,095 | 5/1972 | Krynock et al. | 209/366.5 X |
| 3,677,395 | 7/1972 | Musschoot | 198/766 |
| 3,756,407 | 9/1973 | Christensen | 209/366 X |
| 4,170,549 | 10/1979 | Johnson | 209/367 X |
| 4,819,810 | 4/1989 | Hoppe | 209/326 X |
| 4,886,608 | 12/1989 | Cook | 209/409 X |
| 5,190,645 | 3/1993 | Burgess | 209/364 X |

FOREIGN PATENT DOCUMENTS

| | | | |
|---|---|---|---|
| 618038 | 2/1949 | United Kingdom | 209/367 |

*Primary Examiner*—Tuan Nguyen
*Attorney, Agent, or Firm*—Kenyon & Kenyon

[57] ABSTRACT

The present invention provides an apparatus for retrofitting traditional derrick motor vibrators. In particular, an off-center shaft rotates, shaking a bed in an oscillatory manner. An apparatus of the present invention may be advantageously used to retrofit known shale shakers, achieving significant savings in the cost of repair.

12 Claims, 4 Drawing Sheets

SHALE SHAKER APPARATUS

This application is a continuation of application number 08/205,226 filed Mar. 3, 1994, now abandoned.

BACKGROUND OF THE INVENTION

The invention relates to devices such as shale shakers where a screen is vibrated or oscillated to separate drilling mud from shale or other cuttings. Relatively large solids, such as cuttings from a well, are supported on the screen as the cuttings are moved from an inlet at one end of the screen to an outlet at another end of the screen. During this movement, caused by oscillation, the carrier liquid and more finely divided solids, such as drilling mud, are separated from these cuttings by falling downwardly through the screen. The mud which falls through the screen is further treated and recycled for use in the drilling process.

An example of systems which have been used in the past is shown in U.S. Pat. No. 5,190,645 issued to Burgess on Mar. 2, 1993. In this system, at least one tube is connected to the screen for movement therewith. Typically, both the screen and the tube are mounted horizontally but spaced apart in the hollow body of the shale shaker and the repetitive movements are applied to the entire body of the shaker apparatus.

As shown in FIG. 1, the system in which such a shaker operates includes a well 110 being drilled by a bit 112 carried on a drill pipe 114. Drilling mud is pumped by a pump 118 into drill pipe 114 and out through nozzles in the bit 112. The mud cools and cleans the cutters of the bit 112 and then passes up through the well annulus 116 flushing cuttings out with it. A pumping system is generally provided to remove the cuttings from the well annulus 116.

After the mud is removed from the well annulus 116, it is treated before being pumped back into the pipe 114. First, the mud enters the shale shaker 120 where the relatively large cuttings 122 are removed. The mud then may enter a de-gasser 124 where impure gases may be removed if necessary. The de-gasser 124 may be automatically turned on and off by a computer 134 connected to de-gasser 124 by line 25. The computer 134 decides whether to turn the degasser on or off using data from a sensor assembly 136 which is connected to computer 134 by line 182. The mud then passes to a de-sander and (or a de-silter), jointly represented by station 126 and to treating station 128 where, if necessary, conditioning media may be added from source 130. As shown, suitable flow control means, indicated by valve 132, controls the flow of media from source 130 to station 128. Valve 132, in turn, may also be automatically opened or closed by computer 134 using data from sensor assembly 136.

From station 128, the mud is directed to tank 140, from which pump 118 takes suction, to be recycled through the well. The system shown is exemplary, and it will be understood that additional components of the same types or other types could be included.

Most known shakers are non-modular systems. Derrick Systems' shaker, which is of this type, has been very commercially successful. In these non-modular systems, the vibrator and motor are included in the same housing. This makes replacing the motor both expensive and difficult. Where the motor is an integral part of the system and thus confined to the housing, as above, special cooling systems must be used because air cooling is not possible. For this purpose, it is often the case that expensive hydraulic oil systems are used to cool and lubricate the motor. But then, not only is the working of the motor dependent on the working of the oil system, but oil is a well known pollutant and its use increases the chance of spills.

U.S. Pat. No. 2,947,410 to Carrier Jr. describes a drive for a vibrating device including an eccentric shaft. U.S. Pat. No. 3,240,322 to Allen et al. describes a drive for a vibrating device which also includes an eccentric pulley drive. These references, however, do not achieve the advantages of the present invention because they do not describe a simple pulley type connection between a traditional motor and an offset shale shaker shaft. In addition, they are not modular, nor do they allow the object of the invention to be achieved so simply and cheaply.

SUMMARY OF THE INVENTION

The present invention's modularity allows it to be overhauled by anyone with simple mechanical skills. Usually, this includes on-site personnel. This considerably reduces down-time which may result from having to wait for a serviceman. There are very few parts which may need to be replaced in the present invention, and most of these can be replaced easily. In addition, the retrofit invention is grease lubricated, and thus reduces the chance of oil spills.

The retrofit invention may be installed easily with a minimum of tools and skills because it adapts directly in place of most traditional derrick motor vibrators.

The present invention provides an apparatus for shaking material which includes a bed for supporting the material which is underneath a screen which collects the non-fluid components of the material. A bottom is provided to catch the material which passes through the screen. An eccentric shaft rotates about an off-center axis so as to shake the apparatus in an oscillatory fashion. An independently-replaceable motor drives the shaft. The motor performs this function by having its output end being drivingly connected to the drive end of the eccentric shaft. This connection may be conveniently made via a drive belt which passes over a shaft sheave on the drive end of the shaft and a motor sheave on the output end of the motor.

The eccentric shaft generally passes over the bed transversely, and the amount of offset may, for example, be approximately 0.2 inches. The shaft may have a cover placed over it in order to prevent shaken debris from contacting the shaft and possibly damaging it. Finally, the shaft connects to the apparatus via grease-lubricated bearings. The grease may also be provided by an automatic greaser.

DETAILED DISCUSSION OF THE PREFERRED EMBODIMENT

Figure 1:
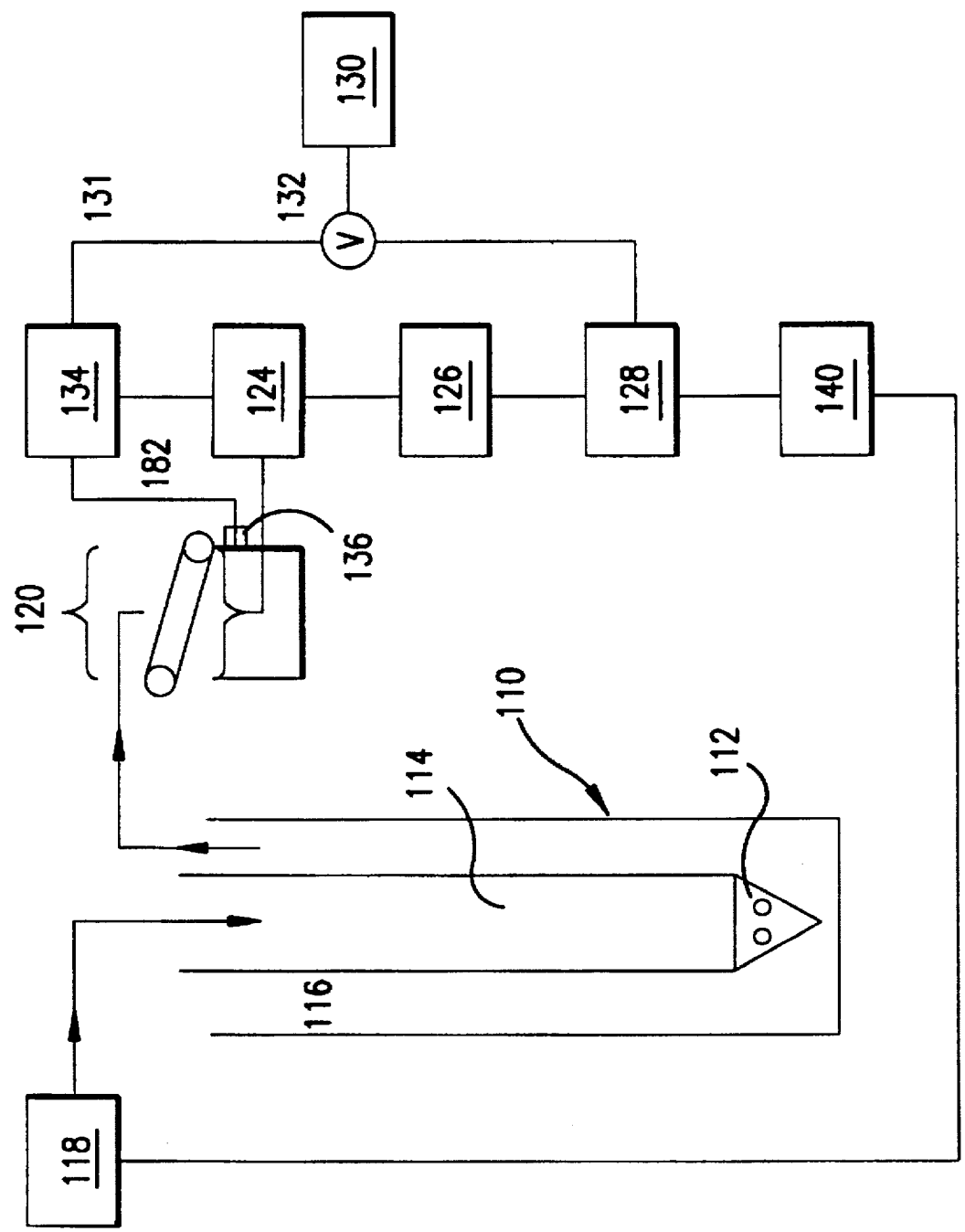
FIG. 1 is a schematic of a drilling system using mud and shale.
Figure 2A:
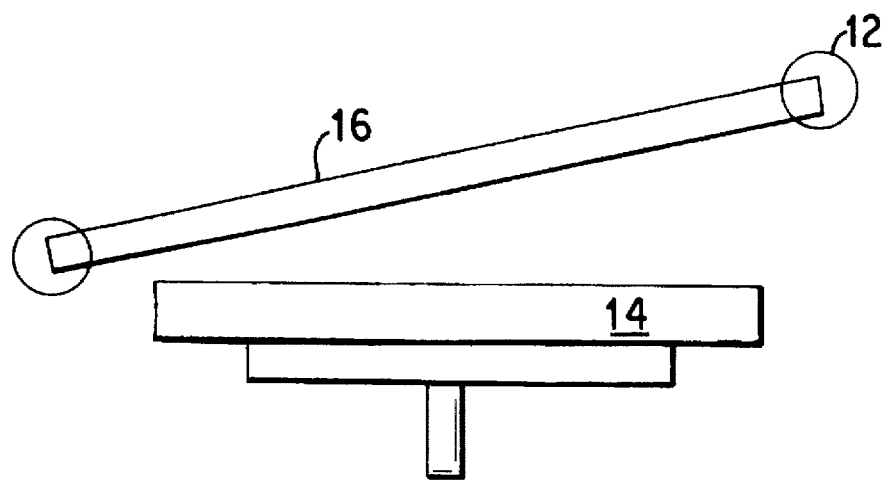
FIG. 2a is a perspective view of a portion of an embodiment of a shale shaker of the present invention.

As shown in FIG. 2(a), the Shale Shaker Apparatus 10 includes a bed 12 for supporting shale material, but through which can pass mud and other liquids. Beneath the bed 12 there is a bottom 14 for directing fluids that pass through the bed to an outlet ultimately for reuse in the drilling process to recover the shale.

The bed 12, in this instance, includes a screen 16 having apertures therethrough small enough to prevent shale from passing therethrough, but large enough to permit mud and fluids to drop through the screen onto the bottom 14 for delivery elsewhere as described above.

Figure 2B:
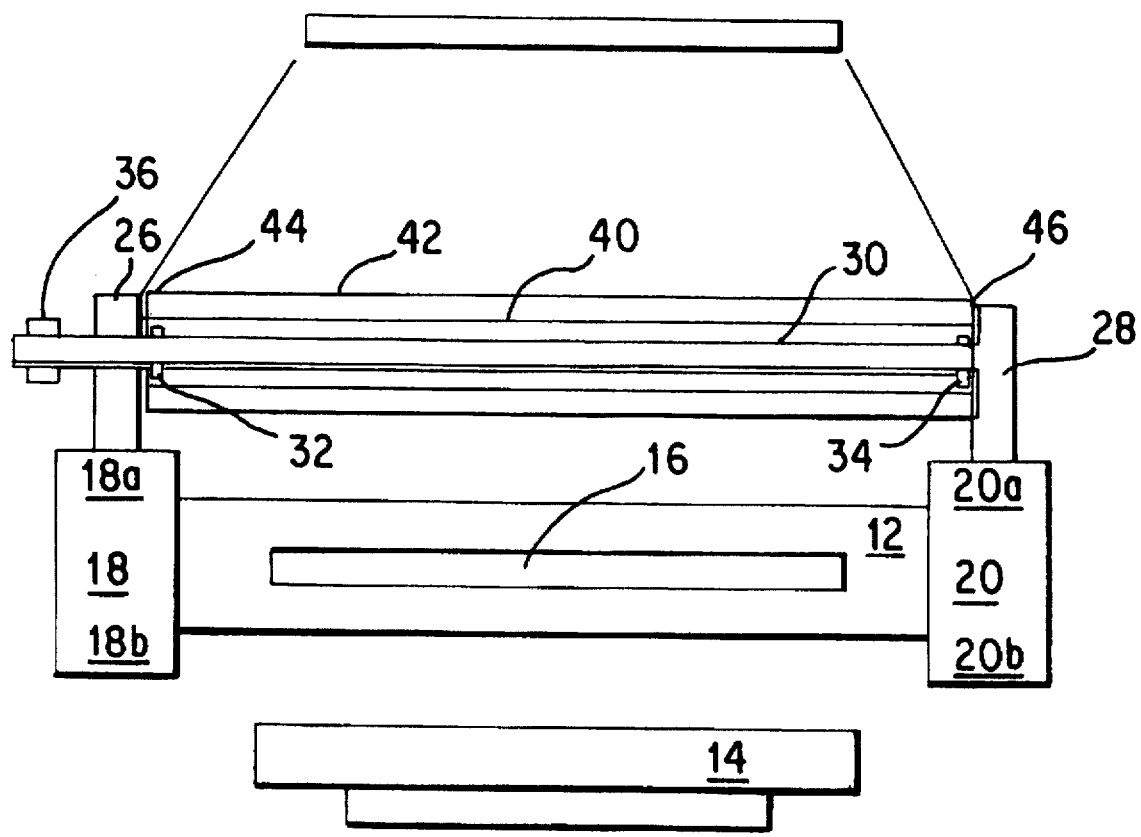
FIG. 2b is an end view of an embodiment of the present invention (the extension of the screen upward has been omitted for clarity).

As shown in FIG. 2(b), bed 12 is constrained by side walls 18 and 20 in a posed parallel relationship, each having an upper surface 18 (a) and 20(a) and a lower surface 18(b) and 20(b) respectively. Mounted on the upper surfaces 18(a) and 20(a) of the side walls are shaft brackets 26, 28 for supporting rotating shaft 30 extending across the bed 12 as shown. The shaft 30 includes a drive end 32 supported by shaft bracket 26 and a journal end 34 supported by shaft bracket 28.

Figure 3:
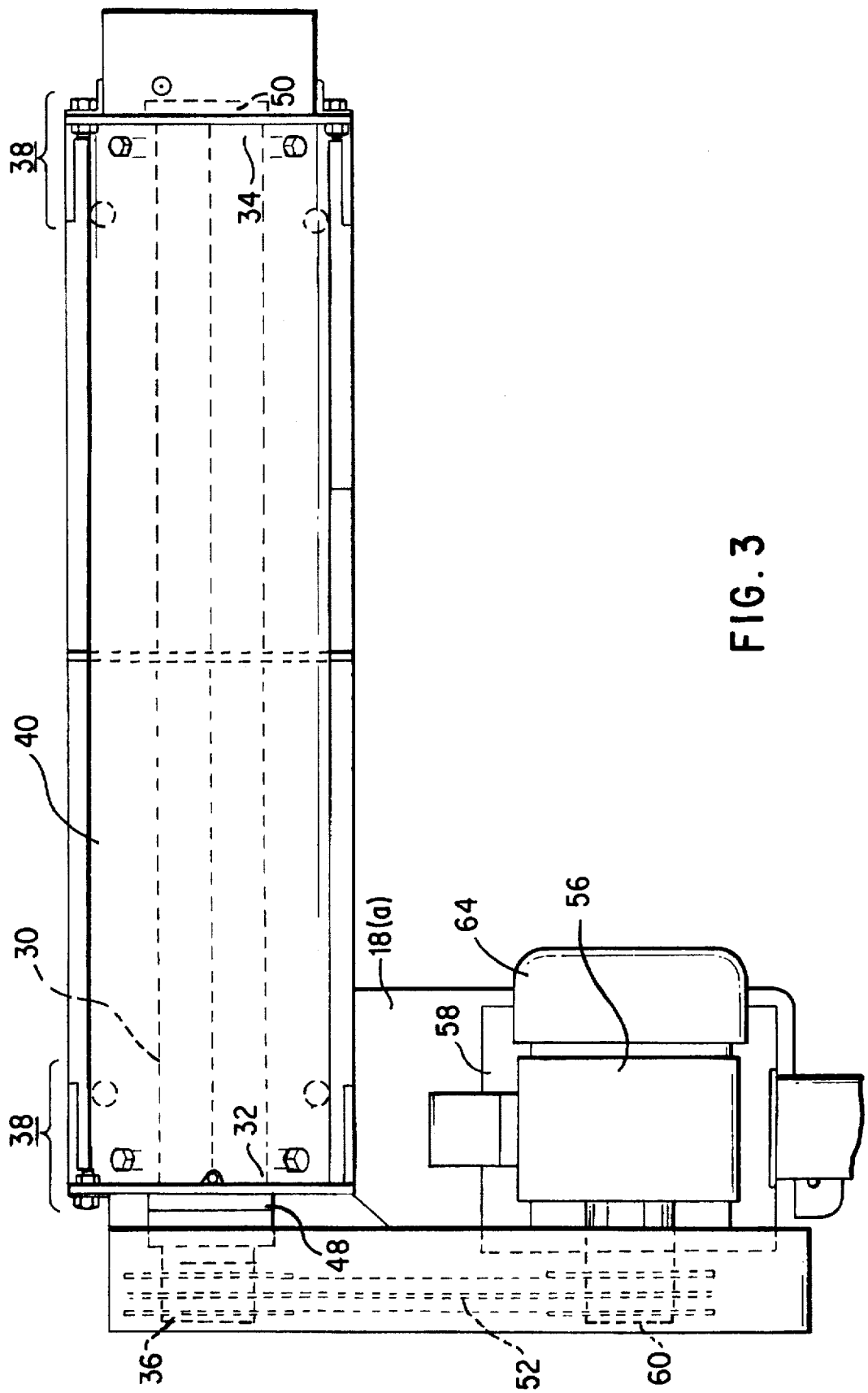
FIG. 3 is a top view of a shale shaker retrofit apparatus according to the present invention.

As shown in FIG. 3, a shaft sheave 36 is fixed onto the drive end 32 of shaft 30 for receiving of belt 52 for rotating the shaft above bed 12. Shaft 30 may, for example, be made of 4140 tensile steel. A mounting assembly 38 for the shaft includes a pipe 40 which extends transversely across the bed between the two brackets 26 and 28. A shaft cover 42, made from arcuate shaped sheet metal, also extends between the brackets 26 and 28 displaced from the pipe 40 in an upward direction. Shaft cover 42 protects pipe 40 and shaft 30 while mud or other fluids are deposited onto the bed during the shale shaking operation.

Cover brackets 44 and 46 are disposed on internal surfaces of the shaft brackets 26 and 28 as shown, to permit attachment of the shaft cover 42 thereon. The shaft cover includes flanges having bolt holes therethrough for registering with the corresponding bolt holes in the cover brackets 44 and 46. Once the cover is in place, and registered with the bolt holes in the cover brackets, registered bolts can be placed therethrough to attach the shaft cover to the brackets.

Bearings 48 and 50 are arranged at the shaft brackets 26 and 28 to receive the shaft ends 32 and 34, respectively, rotatably therein. These bearings utilize grease as a lubricant. This avoids the need to have an oil pump and the associated problems with oil lubricating the rotating shafts. Bearings appropriate for this purpose may be purchased at most bearing houses. For example, standard 2" SKF pillow-block bearings could be used in many applications. The lubricant for these bearings could also be purchased at most bearing houses. Automatic greasers may also advantageously be used in such an embodiment, such as those manufactured by SL Lube Systems. An appropriate grease pressure could be, for example, approximately 2 oz.

Figure 4:
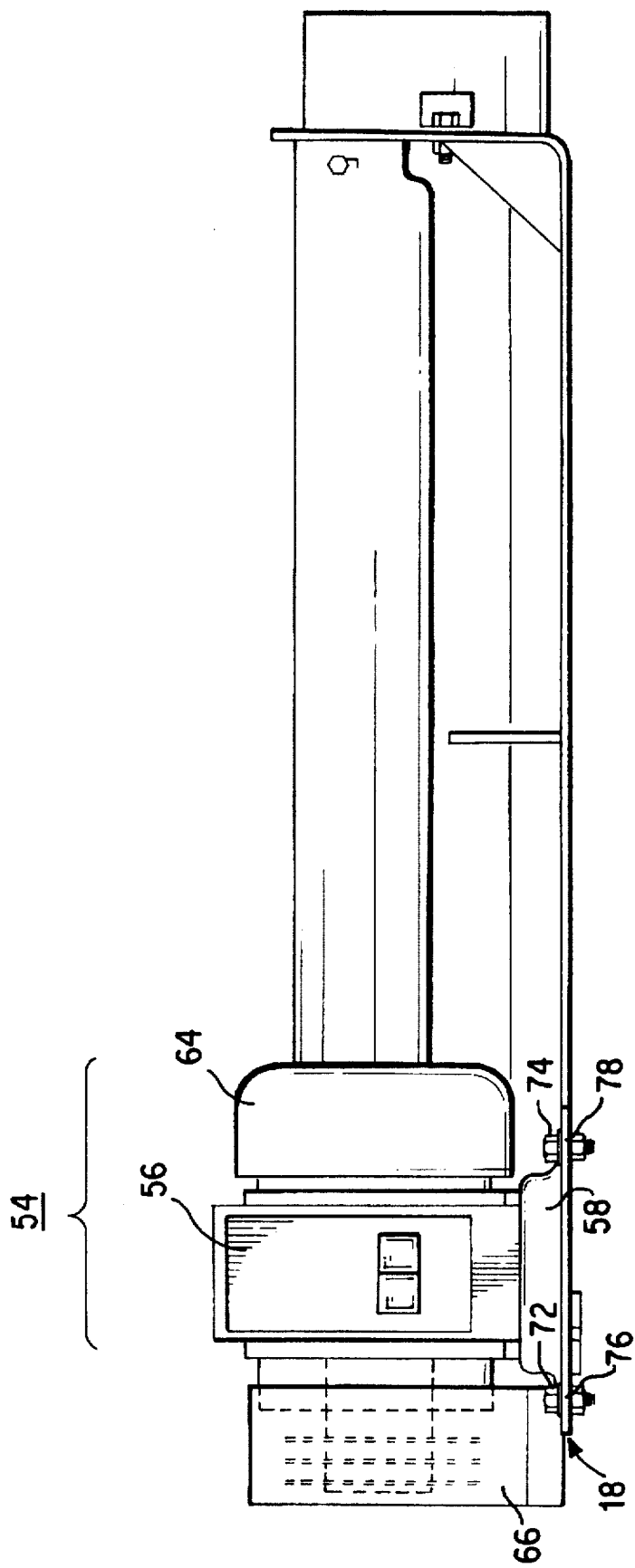
FIG. 4 is a side view of a shale shaker of FIG. 3.

Motor assembly 54 is arranged on an upper surface of the sidewall 18 for driving the shaft sheave 36. As shown in FIG. 4, the motor assembly 54 includes a motor 56 and mounting base 58, which permits the motor to be mounted to the upper surface of side wall 18 as shown. The motor has a drive shaft on which is fixed a motor sheave that is arranged in co-planar relationship with the shaft sheave so that a belt 52 runs between the shaft sheave 36 and the motor sheave 60. In this way, rotation by the motor of the motor sheave drives the belt and ultimately the shaft sheave as well.

Motor 56 includes a rear portion 64 and a front portion 66. The motor is arranged on upper surface of side wall 18 such that the rear portion of the motor extends over the bed 12 and the shaft extends in the same direction and is arranged in co-planar relationship with shaft end 34.

The motor may be of any standard off-the-shelf design, such as one designed to drive a clothes dryer. Particularly advantageous may be a 220 TEFC 5hp 3600 rpm motor. As this motor is air-cooled, no expensive hydraulic oil cooling system is necessary. Generally, the greasing of such a motor need occur only annually. A requirement of this motor, however, is that it be suitable for outdoor use.

Bolt holes 72 and 74 in the motor mounting base 58 are arranged to be registerable with bolt holes 76 and 78 in the upper portion of side walls 18. In this way, once the motor assembly is arranged such that the bolt hole 72 and 74 in the motor mounting base 58 register with the bolt holes 76 and 78; bolts can be placed therethrough to fix the motor in the proper disposition in the apparatus. A belt 52 is entrained about the shaft sheave 36 and the motor sheave 60 to permit the motor to drive the shaft in a known fashion. The shaft is offset about 3/10 of an inch such that during rotation it is in an eccentric position and shakes the entire apparatus. In this manner, as mud with shale is deposited onto the bed, operation of the motor shakes the entire assembly sufficiently to permit the mud to drop through the screen 16 while the shale is retained on top of the bed and delivered to an outlet for further processing.

Where it is necessary to replace the motor, the belt cover can be removed and the motor removed from the assembly by removing the bolts holding the motor assembly to the upper portion of side walls 18. A new motor can be placed in position quickly without having to replace the entire shaft assembly which can be costly and time consuming.

It is clear that in the present invention the motor may be repaired, the drives may be repaired or the offset shaft may be repaired without the need for opening up all three systems. Furthermore, most traditional shale shakers have an rms force of 3.0 to 4.0. This shale shaker has a standard rms force of 4.3. The force is adjustable via changing the rpm of the shaft by means of changing the pulley size. Most every moving part is available at most bearing houses. It can adapt to most any shale shaker by merely changing the length of the shaft. Finally, the electric motor draws less electricity than most standard units so the same electric starter may be used by only changing the heaters in the starter.

What is claimed is:

1. An apparatus for shaking corrosive materials comprising:
   (a) a bed for supporting the material thereon and including an angled screen to permit passage of liquid therethrough;
   (b) a bottom located beneath said bed for receiving the liquid passing through said screen;
   (c) a shaft having a shaft sheave located exterior to said bed and exposed for receiving a driving belt wherein said shaft has a longitudinal axis offset from the axis of rotation of said shaft sheave and wherein said shaft is rotatably fixed above said bed and said screen for continuously vibrating said bed and said screen during rotation and revolution of said shaft; and
   (d) an electric motor removably fixed to said apparatus, located above both of said bed and said screen, and having a motor sheave located exterior to said bed and exposed for receiving said driving belt, said motor drivingly connected to said shaft via said driving belt sheaved over both of said shaft sheave and said motor sheave for rotating said shaft sheave, said rotation of said shaft sheave causing said shaft to vibrate said bed and said screen in a sympathetic oscillation, said motor being removable from said apparatus independently of said shaft.

2. The apparatus for shaking corrosive materials according to claim 1 further comprising:

a belt cover for protecting said shaft sheave, said motor sheave, and said belt from the corrosive materials.

3. The apparatus for shaking corrosive materials according to claim 1 further comprising:

a shaft cover for protecting said shaft from the corrosive materials and to inhibit debris from contacting said shaft during delivery of material to said bed.

4. The apparatus for shaking corrosive materials according to claim 1 wherein said offset shaft is connected across said bed transversely.

5. The apparatus for shaking corrosive materials according to claim 1 further comprising:

bearings using grease as a lubricant, said bearings being located at each end of said offset shaft.

6. The apparatus of claim 5 wherein the grease is provided by an automatic greaser.

7. The apparatus for shaking corrosive materials according to claim 1, wherein the longitudinal axis of said shaft is offset from the axis of rotation of said shaft sheave by about 0.2 inch.

8. An apparatus for shaking corrosive materials comprising:

(a) a bed for supporting the material thereon and including an angled screen to permit passage of liquid therethrough;

(b) a bottom located beneath said bed for receiving the liquid passing through said screen;

(c) an offset shaft rotatably fixed above both of said bed and said screen for continuously vibrating said bed and said screen during rotation and revolution of said shaft, said shaft having a shaft sheave located exterior to said bed and exposed for receiving a driving belt wherein said shaft has a longitudinal axis offset from the axis of rotation of said shaft sheave;

(d) an electric motor removably fixed to said apparatus, located above both of said bed and said screen, and having a motor sheave located exterior to said bed and exposed for receiving said driving belt, said motor drivingly connected to said offset shaft via said driving belt sheaved over both of said shaft sheave and said motor sheave for rotating said shaft sheave, said rotation of said shaft sheave causing said bed and said screen to vibrate in a sympathetic oscillation, said motor being removable from said apparatus independently of said shaft;

(e) a belt cover for protecting said shaft sheave, said motor sheave, and said belt, from the corrosive materials;

(f) a shaft cover for protecting said offset shaft from the corrosive materials and to inhibit debris from contacting said shaft during delivery of material to said bed.

9. The apparatus according to claim 8, wherein said offset shaft is connected across said bed transversely.

10. The apparatus of claim 8, further comprising bearings using grease as a lubricant, said bearings being located at each end of said offset shaft.

11. The apparatus of claim 10, wherein the grease is provided by an automatic greaser.

12. The apparatus of claim 8, wherein the axis of said offset shaft is offset from the axis of rotation by about 0.2 inch.

* * * * *

UNITED STATES PATENT AND TRADEMARK OFFICE
CERTIFICATE OF CORRECTION

PATENT NO. : 5,732,828
DATED : 31 March 1998
INVENTOR(S) : Don Littlefield, Jr.

It is certified that error appears in the above-identified patent and that said Letters Patent is hereby corrected as shown below:

| Column | Line | |
|--------|------|---|
| 2 | 61 | Before "shale" change "a" to --the--. |
| 3 | 21 | Change "4140" to --4140--. |

Signed and Sealed this

Eighth Day of September, 1998

Attest:

BRUCE LEHMAN

Attesting Officer      Commissioner of Patents and Trademarks